United States Patent [19]

Kubota et al.

[11] Patent Number: 5,548,696
[45] Date of Patent: Aug. 20, 1996

[54] IMAGE PROCESSING APPARATUS

[75] Inventors: Shinji Kubota; Hiroaki Nasu, both of Suwa, Japan

[73] Assignee: Seiko Epson Corporation, Tokyo, Japan

[21] Appl. No.: 132,557

[22] Filed: Oct. 6, 1993

[30] Foreign Application Priority Data

Oct. 6, 1992 [JP] Japan .................................. 4-267618
Mar. 25, 1993 [JP] Japan .................................. 5-66830

[51] Int. Cl.$^6$ ...................................................... G06F 15/62
[52] U.S. Cl. .................................................................. 395/135
[58] Field of Search ...................................... 395/166, 167, 395/168, 133, 135; 345/113, 114

[56] References Cited

U.S. PATENT DOCUMENTS

| | | | |
|---|---|---|---|
| 4,232,374 | 11/1980 | Chung et al. | 364/900 |
| 5,131,772 | 7/1992 | Yamaguchi . | |
| 5,319,750 | 6/1994 | Matsuo et al. | 395/166 |
| 5,377,314 | 12/1994 | Bates et al. | 395/135 |

FOREIGN PATENT DOCUMENTS

| | | |
|---|---|---|
| 4-182696 | 6/1992 | Japan . |
| 5-177901 | 7/1993 | Japan . |
| 5-177905 | 7/1993 | Japan . |
| 5-177876 | 7/1993 | Japan . |

Primary Examiner—Phu K. Nguyen
Attorney, Agent, or Firm—Hickman Beyer & Weaver

[57] ABSTRACT

A novel image processing apparatus allows sophisticated but simple image processing with respect to a plurality of input video data, for example, multi-stage data mixing or multiple semi-transparent process. In the image processing apparatus of the invention, a plurality of video data are processed by a predetermined time-sharing operation according to a priority sequence so as to be superposed one upon another. Transparency processing is also executed based on a transparency information bit included in input video data. The image processing apparatus includes data selectors 65 and 72 for selecting video data to be input, a priority sequence chromakey control circuit 96 for driving the data selectors 65 and 72 based on a predetermined priority sequence, a specific image process computing element 75 for executing a predetermined operation with respect to output data of the data selectors 65 and 72 and output data of a time-sharing data latch 74, a coefficient register 130 for determining coefficients used in the operation by the specific image process computing element 75, and a pixel image data latch 76 for finally holding output data of the specific image process computing element 75.

19 Claims, 9 Drawing Sheets

| COLOR PALLET ADDRESS | D15 D14 D13 D12 D11 D10 D9 D8 | D7 D6 D5 D4 | D3 D2 D1 D0 |
|---|---|---|---|
| 0 | Y DATA | U DATA | V DATA |
| 1 | Y DATA | U DATA | V DATA |
| 2 | Y DATA | U DATA | V DATA |
| 3 | Y DATA | U DATA | V DATA |
| ⋮ | | | |
| 100 | Y DATA | U DATA | V DATA |
| 101 | Y DATA | U DATA | V DATA |
| ⋮ | | | |
| 509 | Y DATA | U DATA | V DATA |
| 510 | Y DATA | U DATA | V DATA |
| 511 | Y DATA | U DATA | V DATA |

IMAGE PROCESSING APPARATUS

BACKGROUND OF THE INVENTION

1. Field of the Invention

The present invention relates to an image processing apparatus and a method of the same, and more specifically to an image processing technique for processing a plurality of input image data. The structure of the invention is applicable to a variety of devices and units for simultaneously processing a plurality of image data, such as video game machines.

2. Description of the Related Art

In image processing apparatus such as video game machines, a plurality of image data are often superposed one upon another and displayed as one overlapped image on a screen. Such processing is generally realized by previously determining a priority sequence of the plurality of image data and specifying a certain transparent area in the image data. The priority sequence of image data represents relative positions of image data on a screen or another display device. A conventional superposing process is described based on an example where a plurality of image data represent an image including an inside of a train and scenery seen through a train window. As shown in FIG. 10, a set of image data F shows objects such as a window frame seen in the train while another set of image data B represents scenery seen through the window.

The image data F representing inside of the train is located before the image data B representing the scenery on a display screen. A certain portion of the image data F corresponding to a window pane is specified as transparent. In superposing process of the two image data F and B, the image data F having a higher priority is selected except for the certain portion corresponding to the window pane while the image data B representing the scenery is selected for the certain portion. This generates an image where the scenery is seen through the train window.

FIG. 11 shows a conventional image processing apparatus for implementing such a process described above. The conventional image processing apparatus includes first and second external units 250 and 260 for generating image data. The first external unit 250 sends image data 290 pixel by pixel, priority sequence information 300 showing a relative position of the image data 290 with respect to image data 320 of the second external unit 260, and first attribute information 310 showing whether each pixel is transparent or opaque. The second external unit 260 transfers the image data 320 pixel by pixel and second attribute information 330 showing whether each pixel is transparent or non-transparent.

The priority sequence information and the first and second attribute information are input into a display image data determining circuit 280 for determining which image data is to be selected for each pixel. A selector 270 then switches image data based on results of determination and outputs the image data to form a real-time video image.

The conventional image processing apparatus is generally used for superposing only two image data, and is not applicable to superposing of three or more image data without a supplementary structure. A plurality of complicated, high-speed processing units are thus required for processing three or more image data. This makes the image processing apparatus undesirably expensive, bulky, and complicated. Change of the priority sequence of image data requires switching all of the signals from the plurality of processing units.

The conventional image processing apparatus can not execute multiple semi-transparent superposing, for example, composing an image where a certain object is seen through a transparent water tank. Namely, the conventional system can not execute sophisticated image processing like multi-stage data mixing of a number of input image data as often required in video games.

A known image processing apparatus, for example, as disclosed in JAPANESE PATENT LAYING-OPEN GAZETTE No. 62-264096, processes only one type of image data, and is not applicable to image data of different types, especially superposing of different types of image data.

SUMMARY OF THE INVENTION

The object of the invention is to provide a novel image processing apparatus which allows sophisticated but simple image processing with respect to a plurality of input image data, for example, freely superposing a plurality of image data one upon another.

In the first image processing apparatus of the invention, the input unit inputs image data pixel by pixel, and the pixel processing unit divides an input time period corresponding to one pixel into a plurality of divisions and executes a predetermined process with respect to specific image data corresponding to a pixel element input in one division of the input time period. The predetermined process includes an overlapping process where the specific image data is overlapped with processed image data stored in the divisional processed data storing unit, and another process such as filter processing.

The divisional processed data storing unit latches the specific image data processed by the pixel processing unit for the predetermined process in another division of the input time period divided by the pixel processing unit. More concretely, an input time period corresponding to one pixel is divided into n time segments (n is an integer). Image data processed in a K-th time segment (K is an integer not less than 1 and smaller than n) is latched for the predetermined process in an L-th time segment (L is an integer greater than K and equal or smaller than n). A supplementary register allows image data processed in the K-th time segment to be latched for the predetermined process in a K+1-th time segment as well as a K+2-th or subsequent time segment.

At an end of the input time period corresponding to the pixel, the output unit outputs contents of the divisional processed data storing unit as processed image data of the pixel. Two or more image data is accordingly processed to compose a resultant image. Since the predetermined process is completed in the input time period of the pixel, this structure is applicable to both a moving picture and a still picture.

According to the image processing method of the invention, image data is input in every division of an input time period corresponding to one pixel, processed according to a predetermined process, and latched for the predetermined process in another division of the input time period. At an end of the input time period corresponding to the pixel, the latched image data is output as processed image data of the pixel.

In the second image processing apparatus of the invention, the signal input unit inputs a plurality of signals representing images, and the image identification signal output unit determines whether each of the input signals includes a first image signal directly representing an image or a second image signal representing an image via a predetermined conversion and outputs an identification signal based on the determination. The identification signal may be previously determined for each signal representing an image or output based on an image-form signal included in the plurality of signals.

The image signal adjusting unit executes the predetermined conversion for each of the input signals which is determined to be the second image signal according to the identification signal so as to adjust the plurality of signals in a certain form allowing a predetermined image processing. The image processing apparatus implements the predetermined image processing with respect to a plurality of signals representing color images.

The third image processing apparatus of the invention can execute the time-sharing process of the first image processing apparatus with respect to a plurality of signals adjusted in a certain form by the second image processing apparatus.

These and other objects, features, aspects, and advantages of the present invention will become more apparent from the following detailed description of the preferred embodiment with the accompanying drawings.

DESCRIPTION OF THE PREFERRED EMBODIMENT

Figure 1:
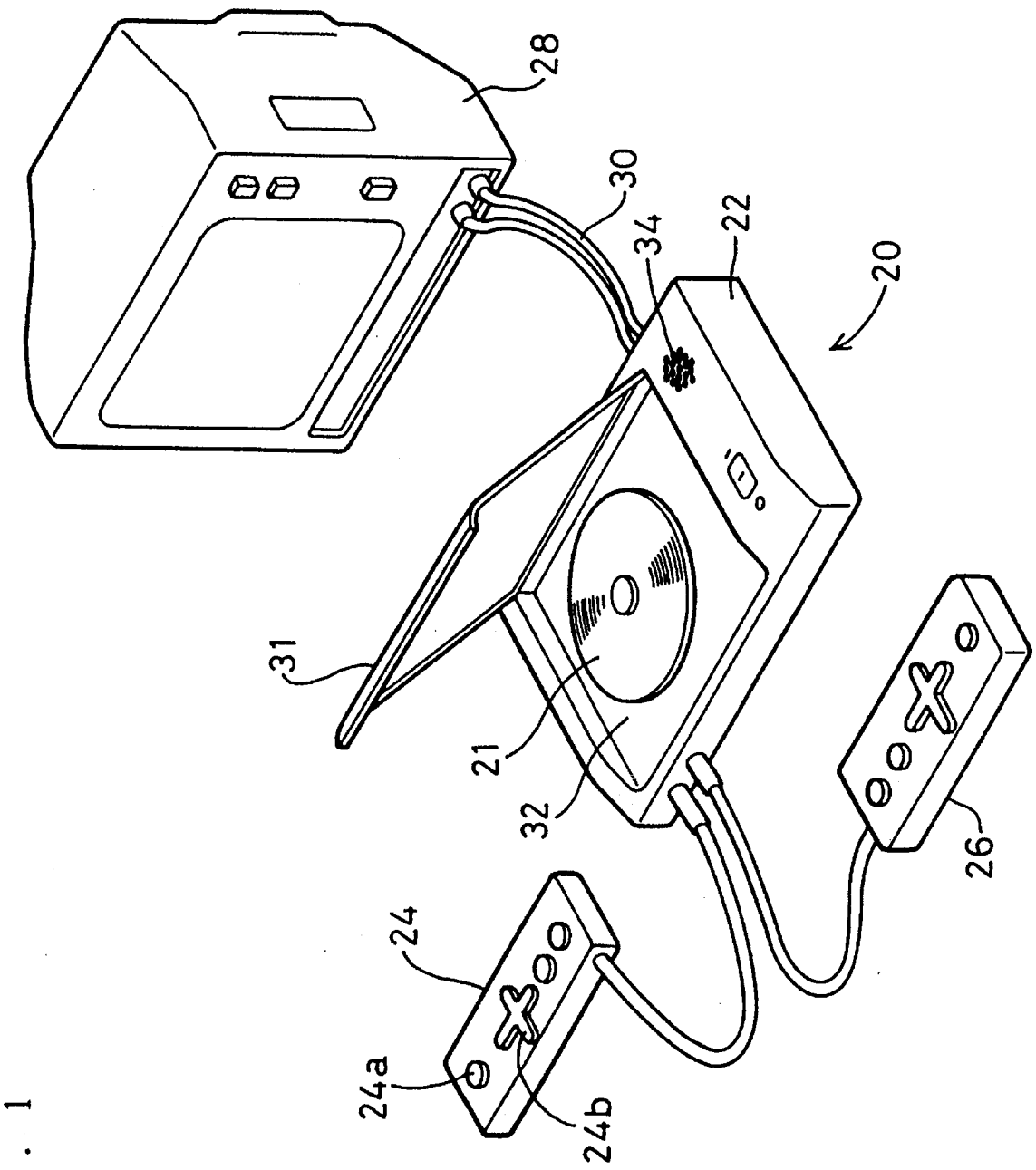
FIG. 1 is a perspective view illustrating a video game machine 20 which includes an image processing apparatus embodying the invention.
Figure 2:
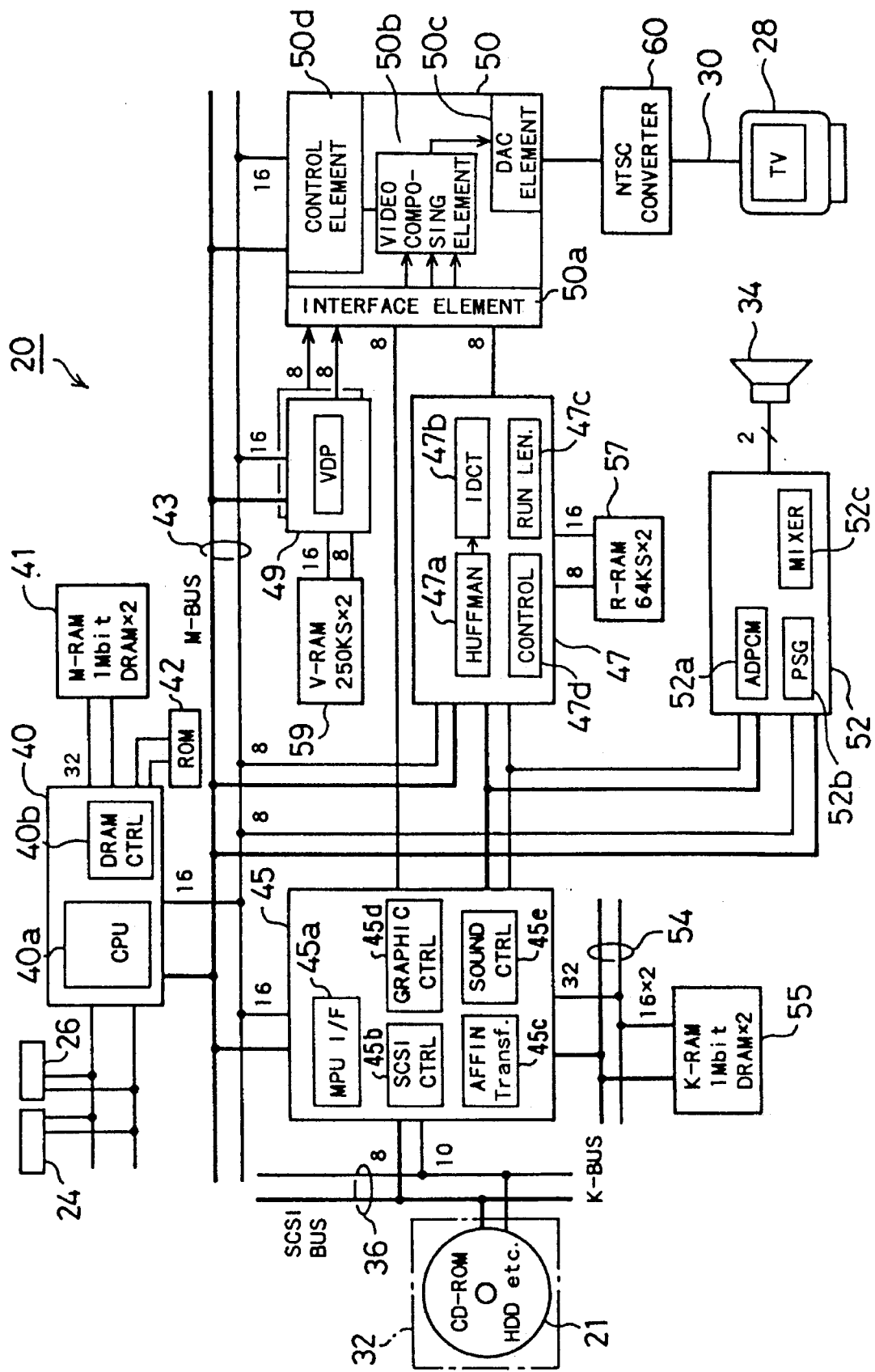
FIG. 2 is a block diagram showing an internal structure of the video game machine 20.

FIG. 1 is a perspective view illustrating a video game machine 20 which includes an image processing apparatus embodying the invention, and FIG. 2 is a block diagram showing an internal structure of the video game machine 20.

The video game machine 20, as shown in FIG. 1, includes a main unit 22 where a CD-ROM (compact disk read-only memory) 21 is removably set, a pair of game pads 24 and 26 connected to the main unit 22, a video signal cable 30 for outputting video signals to a color television 28, and a speaker 34 for outputting audio sound. The main unit 22 has a freely openable cover 31, which is open to allow the CD-ROM 21 to be set on a CD-ROM drive 32 of the main unit 22. The cover 31 is subsequently closed, when a turn table of the CD-ROM drive 32 starts rotation and a microprocessor in the main unit 22 reads a game program and required audio and video information stored in the CD-ROM 21 to start a game. Users can enjoy the game by operating the game pads 24 and 26 each having a switch 24a and a cursor stick 24b.

As clearly seen in the block diagram of FIG. 2, the main unit 22 includes a variety of circuits for reconstructing and displaying a moving picture based on data registered in the CD-ROM 21 and data generated in the machine 20. The video game machine 20 includes the CD-ROM drive 32 connected to a bus SCSI-BUS 36, a micro-processor unit 40 (hereinafter referred to as MPU) for generally executing image processing and other related processing, a main memory unit 41 (hereinafter referred to as M-RAM) directly connected to the MPU 40, and a ROM 42 directly connected to the MPU 40 for storing a BIOS (basic input output systems) program. The video game machine 20 further includes a variety of units connected to a bus M-BUS 43 of the MPU 40; that is, a video signal control unit 45, a video data decompression unit 47, a VDP unit 49 for outputting specified video signals, a video encoder unit 50 for composing video signals and outputting the composed video signals, and an audio data output unit 52 for outputting audio data.

The video game machine 20 also includes a memory K-RAM 55 connected to a local bus K-BUS 54 of the video signal control unit 45, another memory R-RAM 57 connected to a local bus of the video data decompression unit 47, a video memory V-RAM 59 connected to a local bus of the VDP unit 49, an NTSC converter 60 for converting output signals from the video encoder unit 50 to normal video signals (NTSC signals) and outputting the NTSC signals to the color television 28.

The MPU 40 is a high-speed data processing circuit having an operation element 40a for executing arithmetic logic operation including floating point operation, and a dynamic memory controller element 40b. The MPU 40 receives and outputs data from and to the game pads 24 and 26 and the CD-ROM 21 according to a program in the M-RAM 41 using the BIOS program previously stored in the ROM 42, and controls the variety of units to display moving pictures and output audio sound for proceeding of a game.

Each of the video signal control unit 45, the video data decompression unit 47, the video encoder unit 50, and the audio data output unit 52 is composed of an arithmetic and logical operation unit. Structure and functions of each unit will be described briefly.

Video Signal Control Unit 45:

The video signal control unit 45 includes an MPUI/F (MPU InterFace) 45a for receiving and outputting data from and to the MPU 40 via the M-BUS 43, an SCSI controller 45b for receiving and outputting data from and to the CD-ROM drive 32 via the SCSI-BUS 36, an AFFINE transform unit 45c for executing affine transformation of video data input from the CD-ROM 21, a graphic controller 45d for controlling output of video data received from the CD-ROM 21, and a sound controller 45e for controlling output of audio data. The video signal control unit 45 extracts video data and audio data out of all the input data from the CD-ROM 21 and temporarily stores the audio and video data (AV data) in the K-RAM 55. Under control of the MPU 40, the AV data stored in the K-RAM 55 are output at a predetermined timing to the video data decompression unit 47 and the audio data output unit 52 through the graphic controller 45d and the sound controller 45e. When the MPU 40 instructs a predetermined affine transformation of video data, the AFFINE transform unit 45c executes the predetermined affine transformation to implement linear conversion of video data or modification of an image.

Video Data Decompression Unit 47:

The video data decompression unit 47 includes a Huffman decoding unit for Huffman decoding of input video data, an IDCT unit 47b for executing Inverse Discrete Cosine Transform (IDCT) of Huffman decoded data, a run length unit 47c for executing run length decompression of input video data, and a decompression controller 47d for controlling the units 47a through 47c. The decompression unit 47 decompresses compressed video data input from the video signal control unit 45 or the MPU 40 based on an adequate algorithm.

VDP Unit 49:

The VDP unit 49 has two identical chips mounted thereon. The two chips perform an identical function for generating a background image and a block-unit image generally called a sprite, both having a specific pattern and color. The sprite is a specific image which allows simple display of a certain block frequently generated and erased as well as a moving character used in a game or the like. A plurality of sprites corresponding to block-unit video signals are simultaneously output with a background image according to control signals from the MPU 40. Sprite images including required characters are stored in the V-RAM 59 connected with the VDP unit 49. When the MPU 40 outputs a certain command such as move the character from one plane to another place, the VDP unit 49 analyzes the certain command and easily implements a movement corresponding to the certain command by successively generating and erasing a sprite stored in the V-RAM 59 along a path of the movement.

Video Encoder Unit 50:

The video encoder unit 50 includes an interface element 50a for receiving video data from the video signal control unit 45, the video data decompression unit 47, and the VDP unit 49, a video composing element 50b, including a look-up table for determining a color of each video data and a circuit for setting a priority sequence of a plurality of input video data, for composing the plurality of input video data according to the priority sequence, a DAC (digital/analog converter) element 50c for converting the composite video data to analog signals, and a control element 50d for controlling the video composing element 50b. Details of each element will be described later. The video encoder unit 50 receives one set of video signals from the video signal control unit 45, one set of video signals from the video data decompression unit 47, and two sets of video signals including a background image and a sprite from the VDP unit 49, and composes images corresponding to these video signals according to a predetermined priority sequence. The relationship between two composing images may be varied by a plurality of grades; that is, a higher priority image (an image laid over the other) may vary from transparent to opaque with respect to a lower priority image (an image laid under the other).

Audio Data Output Unit 52:

The audio data output unit 52 outputting sound and music from the speaker 34 includes an ADPCM element 52a for executing sound composition by adaptive differential pulse coding modulation (ADPCM), a sound source generator (PSG) 52b allowing simultaneous generation of predetermined plural sound sources, and a mixer 50c for composing composite sounds by the ADPCM element 52a or sounds from the plurality of sound sources. The audio data output unit 52 composes a sound based on data from the video signal control unit 45 or the MPU 40 or plays a piece of music using one or a plurality of sound sources in order to output the composite sound or the piece of music to the speaker 34. Although only one speaker 34 is installed in the main unit 22 to generate monaural sound, an external speaker, for example, mounted on the color television 28 may be used for generate stereo sound.

Figure 3:
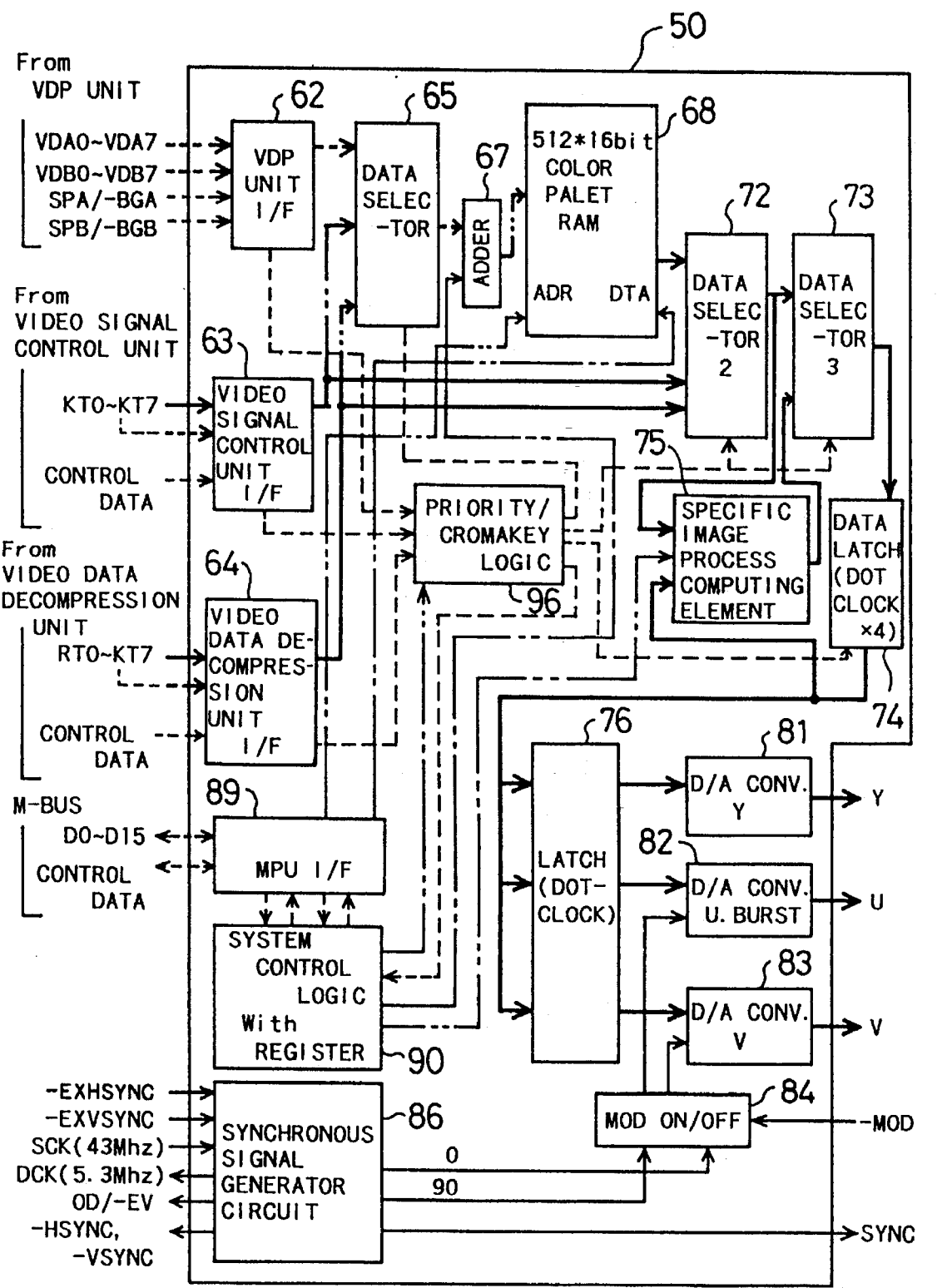
FIG. 3 is a block diagram showing an internal structure of a video encoder unit 50 constituting the image processing apparatus of the embodiment.

Details of the video encoder unit 50 embodying the image processing apparatus of the invention are described hereinafter according to FIGS. 3 through 5. In FIG. 3, thick solid lines represent flow of YUV data, thick two-dot chain lines show flow of pallet data, thin two-dot chain lines for flow of register information, broken lines for flow of control signals, and thin solid lines for control signals of synchronous video signals.

Each YUV data is a 24-bit signal consisting of 8-bit Y data, 8-bit U data, and 8-bit V data, where Y data represents brightness, U data color difference information of a blue and yellow color, and v data color difference information of a red and green color. In the embodiment, the YUV data are input from the video signal control unit 45 and the video data decompression unit 47. The 8-bit Y data shows black by the value '00' and white by the value 'FF'. In a natural color display mode using 16.77 million colors, all the eight bits of U data or V data are effective. In another color display mode using 65,536 colors, on the other hand, the lower four bits are equal to zero and only the higher four bits are effective. U data or V data each representing a value with a positive or negative sign shows colorless by the value '80' in the natural color display mode and in the 65,536-color display mode.

The pallet data denotes video data generated as YUV data after referring to a color pallet (described later). In the embodiment, the pallet data are input from the VDP unit 49, the video signal control unit 45, and the video data decompression unit 47. The color of a video image expressed by pallet data is varied by referring to a different address in the color pallet. Pallet data may totally represent 65,536 colors. In the embodiment, the color pallet has 512 addresses to show 512 arbitrary colors extracted from 65,536 colors.

The register information defines operation of the video composing element 50b and is output from the control element 50d to the video composing element 50b to be processed within the video composing element 50b. The control element 50d includes a plurality of registers which store data to be read out or written in by the MPU 40. The video composing element 50b executes a variety of processes according to values written in the registers. The control signal controls an activating timing of each element.

As shown in FIG. 3, the interface element 50a of the video encoder unit 50 includes a VDP unit interface 62 (hereinafter referred to as the first I/F) for receiving two sets of video data from the VDP unit 49, a video signal control unit interface 63 (hereinafter referred to as the second I/F) for receiving one set of video data from the video signal control unit 45, and a video data decompression unit interface 64 (hereinafter referred to as the third I/F) for receiving one set of video data from the video data decompression unit 47. Internal structures of the first through third interfaces 62, 63, and 64 will be described later.

The video composing element 50b includes a plurality of circuits described below:

a first data selector 65 for selecting a certain type of a video signal referring to a color pallet, out of signals from the first through third interfaces 62, 63, and 64;

an adder 67 for adding a required off-set value to an output from the first data selector 65;

a color pallet 68 receiving an output from the adder 67 and outputting corresponding YUV data in 16-bit format, a second data selector 72 for selecting one of YUV data from the color pallet 68, the same from the second I/F 63, and the same from the third I/F 64;

a third data selector 73 for selecting either output data from the second data selector 72 or the same from a specific image process computing unit (described later);

a time-sharing data latch 74 for latching an output from the third data selector 73;

a specific image process computing unit 75 for executing a specific image superposing operation (described later) for data held in the time-sharing data latch 74 and output data from the second data selector 72;

a pixel image data latch 76 for dividing an output from the time-sharing data latch into Y, U, and V signals and holding the divided signals after completion of superposing operation for one pixel;

D/A converters 81, 82, and 83 for converting output data from the pixel image data latch 76 to analog signals;

an MOD setting element 84 for determining whether each output signal from the D/A converters 81 through 83 is set up as a composite signal or a component signal; and a synchronous signal generator circuit 86 for generating a dot clock DCK and horizontal and vertical synchronous signals in response to a system clock SCK and external synchronous signals.

The synchronous signal generator circuit 86 outputs synchronous signals to the time-sharing data latch 74 and the pixel image data latch 76 (not shown by the lines) as well as the MOD setting element 84.

The control element 50d includes an MPU interface 89 for controlling data input and output with the MPU 40, a system control logic 90 having a plurality of registers for storing data written by the MPU 40 and outputting register information and control signals to control the whole video encoder unit 50, and priority sequence chromakey control circuit 96 for controlling a priority sequence of video data and chromakey information.

The priority sequence chromakey control circuit 96 receives control signals from the first I/F 62, the second I/F 63, and the third I/F 64 and register information from the system control logic 90. This control circuit 96 controls operation of the first data selector 65, the third data selector 73, and the time-sharing data latch 74 based on the chromakey setting and the priority sequence of video data input through the first through third I/Fs 62 through 64. Register information from the system control logic 90 is also input into the adder 67 and the specific image process computing element 75. The register information input in the adder 67 determines an off-set value of a referring address in the color pallet 68. The register information input in the specific image process computing element 75 determines a degree of image superposing process executed therein.

The first through third I/Fs 62, 63, and 64 of the interface element 50a have substantially identical structures and functions. FIG. 4 is a block diagram showing an internal structure of each I/F 62, 63, or 64 which adjusts difference of video signals externally output. Each I/F 62, 63, or 64 receives three different video signals, that is, video data of 16.77 million colors, video data of 65,536 colors, and pallet data generated by referring to the color pallet 68. These video signals are composed of 8-bit parallel signal set in time series and adjusted by the interface element 50a.

Figure 4:
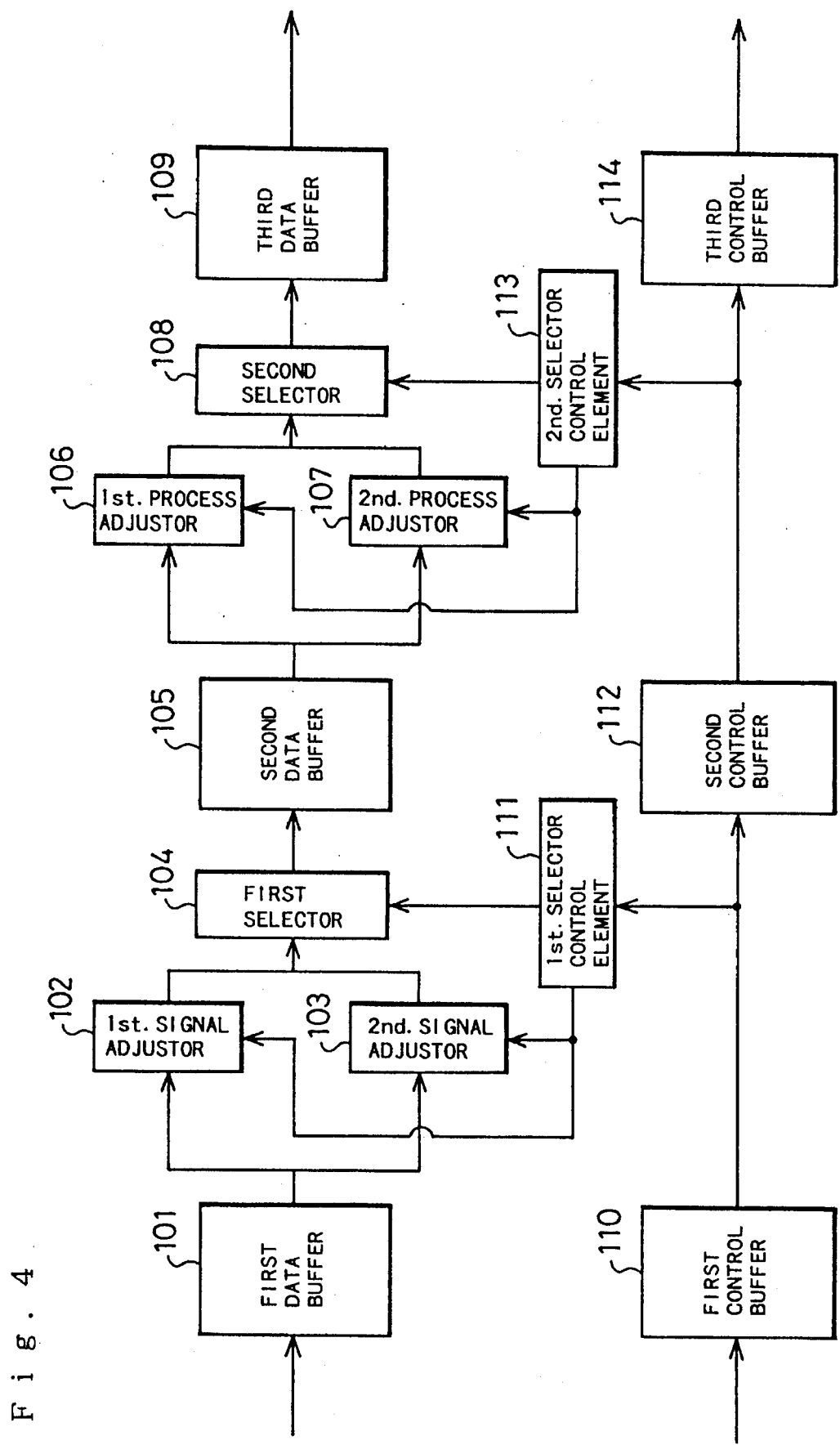
FIG. 4 is a block diagram showing an internal structure of an interface element 50a of the video encoder unit 50.

As shown in FIG. 4, each I/F 62, 63, or 64 includes a first data buffer 101 for receiving video data externally output, first and second signal adjustors 102 and 103 for executing different processes with respect to data temporarily stored in the data buffer 101, and a first selector 104 for selecting either an output signal from the first signal adjustor 102 or the same from the second signal adjustor 103. The I/F further includes a second data buffer 105 for storing output signals from the first selector 104, first and second process adjustors 106 and 107 for executing different processes with respect to data stored in the second data buffer 105, a second selector 108 for selecting either an output signal from the first process adjustor 106 or the same from the second process adjustor 107, and a third data buffer 109 for storing signals from the second selector 108. The I/F also includes a first control buffer 110 for receiving control data input with image data, a first selector control element 111 for controlling selection of the first selector 104 by referring to data stored in the first control buffer 110, a second control buffer 112 for storing control data for a subsequent process, a second selector control element 113 for controlling selection of the second selector 108 by referring to data stored in the second control buffer 112, and a third control buffer 114 for storing control data for processing by the video composing element 50b.

The first data buffer 101 successively stores three different types of video data input according to a predetermined time series. Since a bus used for input of video data, for example, from the VDP unit 49 is applicable only to 8-bit data, natural color video data, that is, 16-bit video data of 655,536 colors or 24-bit video data of 16.77 million colors can not be input in the video encoder unit 50 at once. The first data buffer 101 receives video data sent by divisions and stores the divisions of video data for a subsequent process.

The first and second signal adjustors 102 and 103 respectively adjust an arrangement of these video data. FIG. 5 is a timing chart showing input of a variety of video data. Each video data has attribute information formed as control data, which includes a 'plane number' representing a priority sequence and a 'color number' representing a number of colors used for display. When 16.77 million colors are specified, video data input into the interface element 50a includes 8-bit Y1 data, 8-bit Y2 data, 8-bit U data, and 8-bit V data. This shows a first dot of video data as 'Y1, U, v' and a second dot of video data as 'Y2, U, V'. The first signal adjustor 102 stores input video data in the first data buffer 101 and adjusts the input video data by two bits to 24-bit YUV data. The first signal adjustor 102, for example, consists of a data selector and registers of 8 bits×3×2 steps, where the data selector successively selects input video data and stores required video data in each register, so that video data input according to the predetermined time series are adjusted to complete 24-bit color digital data.

Video data of 65,536 colors includes 8-bit Y data, upper 4-bit U data, and lower 4-bit V data. The first signal adjustor 102 identifies video data of 65,536 colors according to the control data and adjusts video data input by eight bits to 24-bit color data including 8-bit Y data, 8-bit U data having the value '0' for the lower four bits, and 8-bit V data having the value '0' for the lower four bits.

Figure 5:
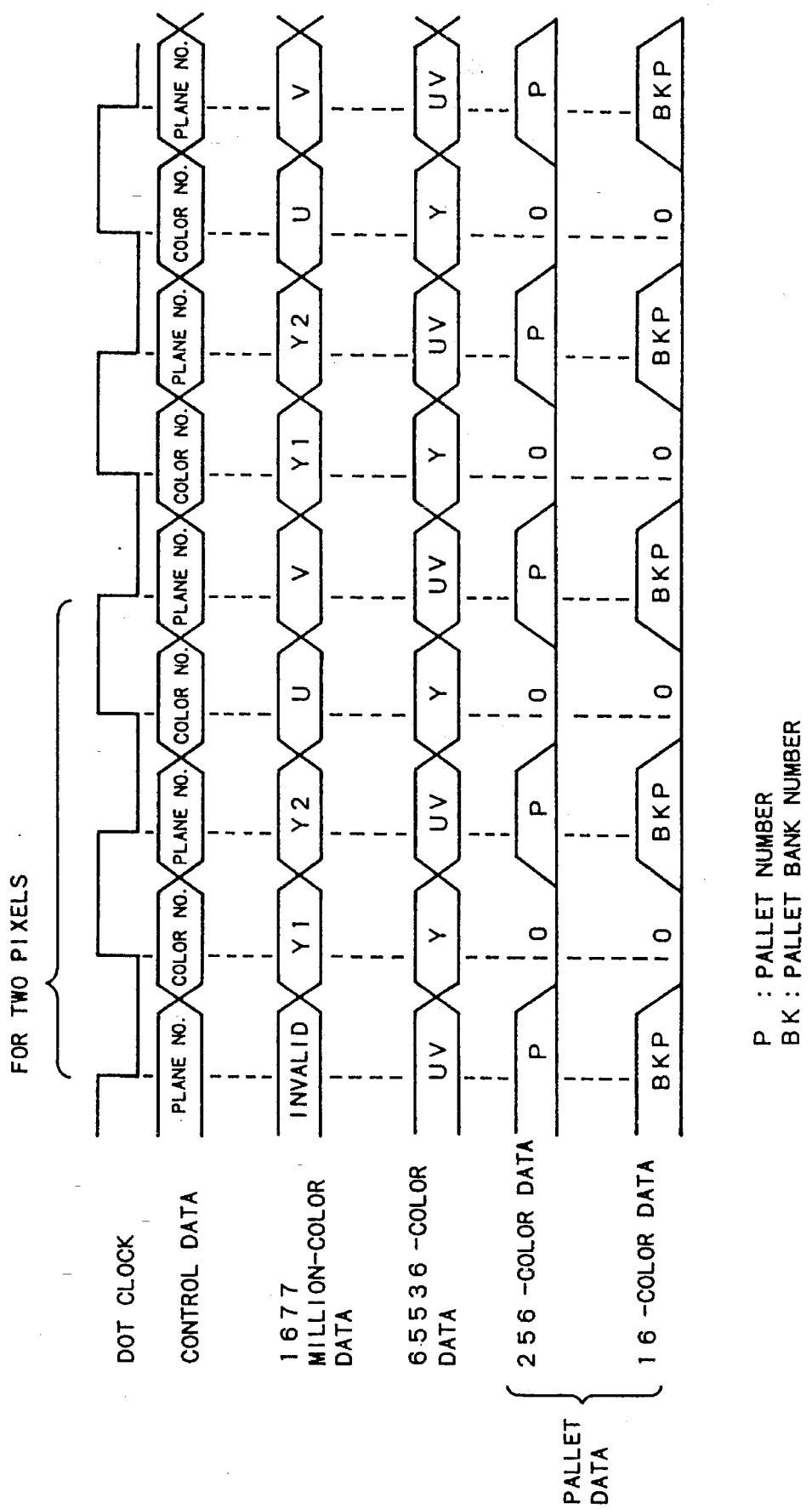
FIG. 5 is a timing chart showing input timing of video data.

The second signal adjustor 103 determines whether pallet data input after every inactive data is 256-color display or 16-color display, and outputs unprocessed 8-bit pallet data for the former case and adjusts 8-bit pallet data by taking account of a pallet bank number BK for the latter case as shown in FIG. 5.

The first and second process adjustors 106 and 107 execute specific processes for an image, for example, preparation of video data representing transparency. The first process adjustor 106 identifies YUV data such as 16.77 million-color data or 65,536-color data representing transparency and sets Y data equal to zero. In a similar manner, the second process adjustor 107 identifies pallet data representing transparency and sets pallet data itself or a pallet number P to zero.

Figures 6, 7:
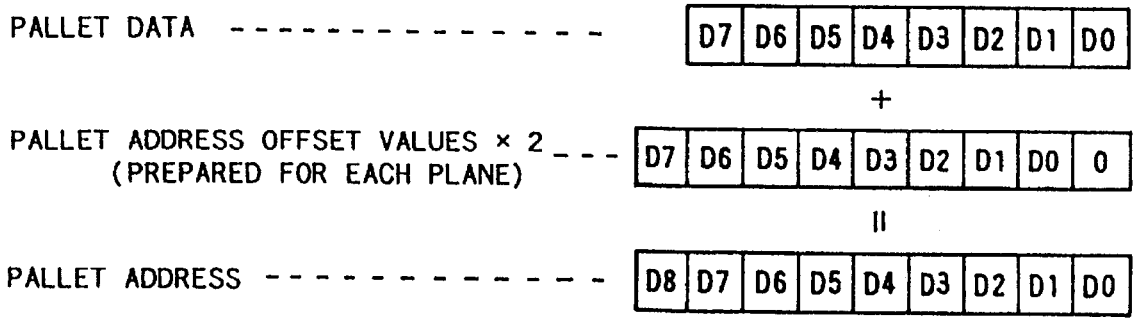
FIG. 6 shows composition of pallet address.
FIG. 7 shows an exemplified combination of data in a color pallet 68.

Video data thus adjusted (digital color data or pallet data) are output to the video composing element 50*b*. Pallet data are input to the color pallet 68 via the first data selector 65 and the adder 67. The adder also receives an address off of set value of the color pallet 68 as register information from the system control logic 90. The address off-set value is multiplied by two and added to the pallet data. As shown in FIG. 6, twice the address off-set value shifted leftward by one bit is added to the pallet data to generate a 9-bit color pallet address. The size of the color pallet 68 is defined by nine bits (512 addresses) in an address dimension and sixteen bits in a data dimension as shown in FIG. 7.

The color pallet 68 consists of 8-bit Y data, 4-bit U data, and 4-bit V data and allows arbitrary 512 colors to be extracted from a total of 65,536 colors. Data output from the color pallet 68 includes three sets of 8-bit video data, that is, 8-bit Y data, 8-bit U data separated from V data and having '0000' in its lower four bits, and 8-bit V data separated from U data and having '0000' in its lower four bits. All 16.77 million-color video data 65,536-color video data, and pallet data are adjusted to three sets of 8-bit signals before input into the second data selector 72. As previously mentioned, U data and V data respectively represent data each having a positive or negative sign, wherein '80' represents zero in binary coded decimal notation.

Figure 8:
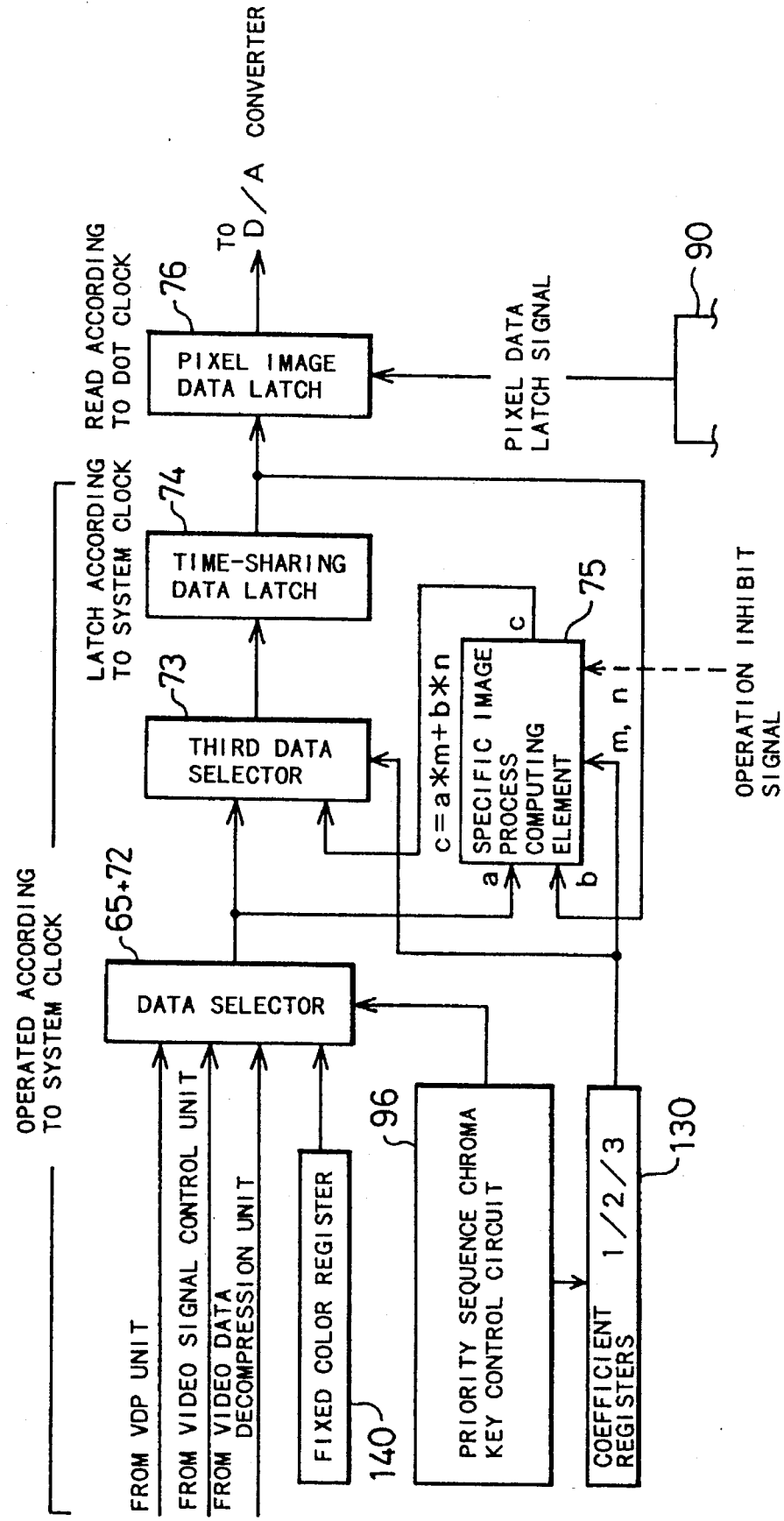
FIG. 8 is a block diagram showing a video composing element 50b.

Operation of the specific image process computing element 75 for overlapping video data thus adjusted with one another is described according to the block diagram of FIG. 8. Among the plurality of registers in the system control logic 90, a coefficient register 130 for setting a degree of image superposing and a fixed color register 140 for specifying an overlay of a specific color upon an image plane having a lowest priority or a further overlay of a color upon a previously superposed image plane. Video data from the video signal control unit 45, the video data decompression unit 47, and the VDP unit 49 may be YUV data or pallet data. In the latter case, the pallet data is converted to 24-bit YUV data (hereinafter referred to as digital video data) via the color pallet 68 as described above. In the block diagram of FIG. 8, the first data selector 65 and the second data selector 72 (see FIG. 3) are shown as a data selector 65+72. Although video data from each unit includes control data representing transparency information or the like, flow of the control data specified by the MPU 40 is omitted in FIG. 8.

Video data from each unit is transferred at a cycle of 200 nS in the embodiment. Four types of input signals are transferred simultaneously and synchronously with the dot clock DCK (see FIG. 5). The digital video data includes one bit of transparency information as control data. The data selector 65+72 is a 24-bit selector having four inputs and one output, which selects one of input video data and outputs 24-bit digital video data. The priority sequence chromakey control circuit 96 outputs a selection signal to the data selector 65+72 and the coefficient register 130 according to a priority sequence specified by the MPU 40 at a cycle of every 50 nS synchronously with the system clock SCK having a frequency four times as great as that of the dot clock DCK.

The coefficient register 130 determines a coefficient of a specific operation executed in the specific image process computing element 75 (described later). In the embodiment, three effective coefficient register 130 having register number 1 through 3 are used according to a number of superposing digital video data. There is also an effective coefficient register 130 having additional register number 0 (not shown) giving no coefficient. When the register number 0 is selected on the effective coefficient register 130, it makes the video data transparency. The priority sequence chromakey control circuit 96 outputs a selection signal to the data selector 65+72 synchronously with the system clock SCK, and selects one of the coefficient register elements 130. When transparency information is set equal to one, the effective coefficient register 130 having register number 0 is selected, and the third data selector 73 is switched to allow output from the specific image process computing element 75, in place of output from the data selector 65+72, to be transferred to the time-sharing data latch 74.

Figure 9:
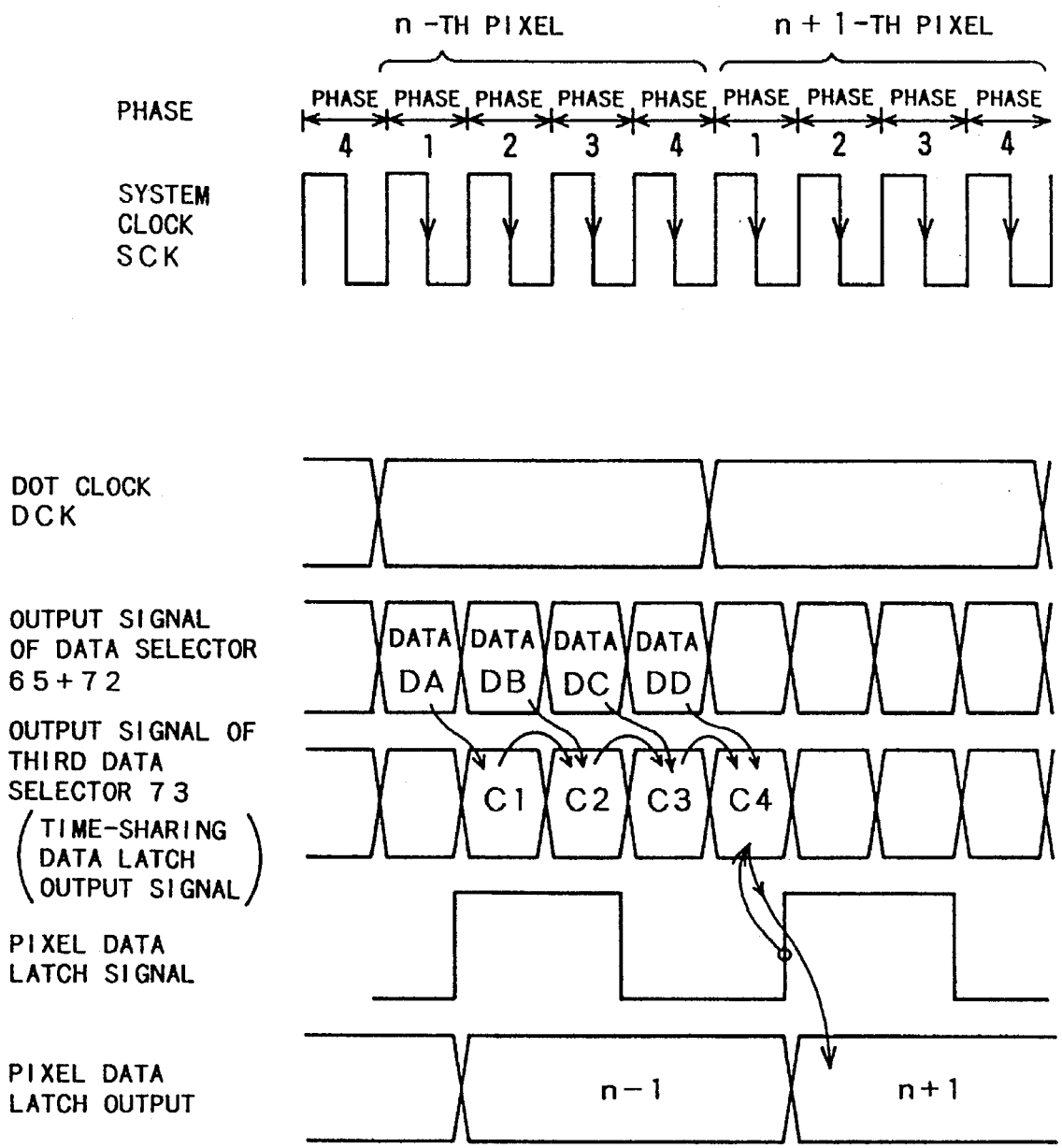
FIG. 9 is a timing chart showing operation of the video composing element 50b.
Figure 10:
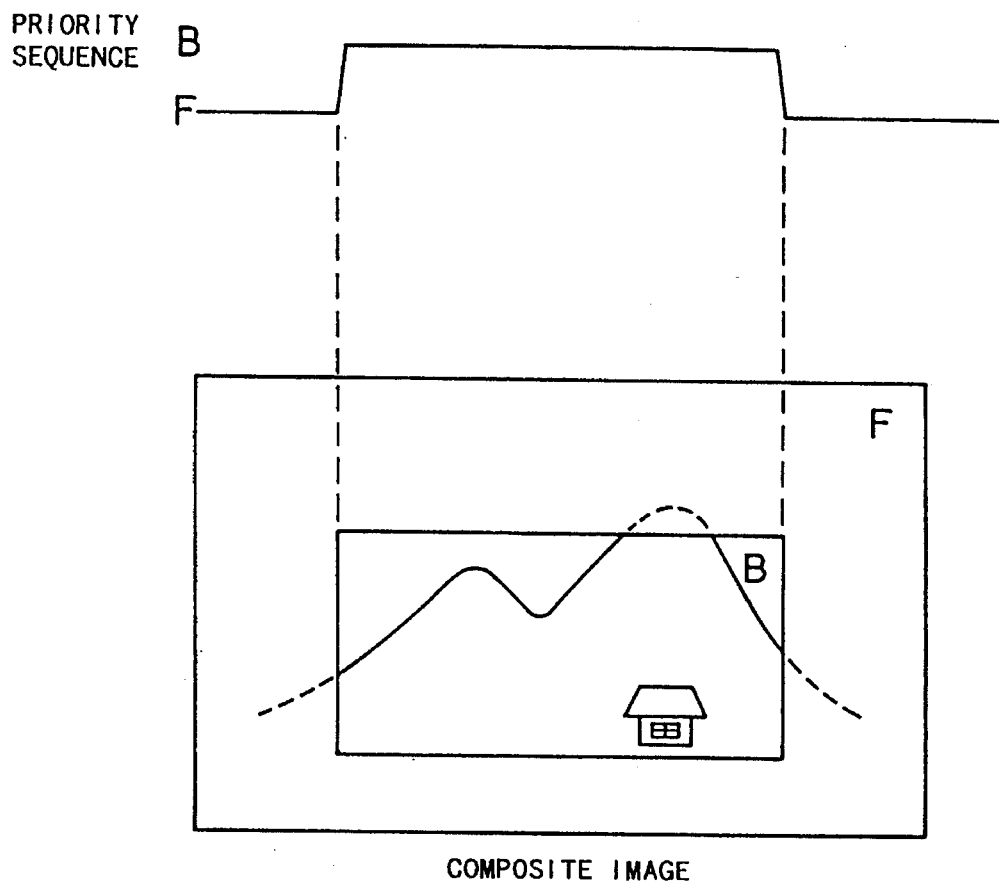
FIG. 10 shows overlayed image data.
Figure 11:
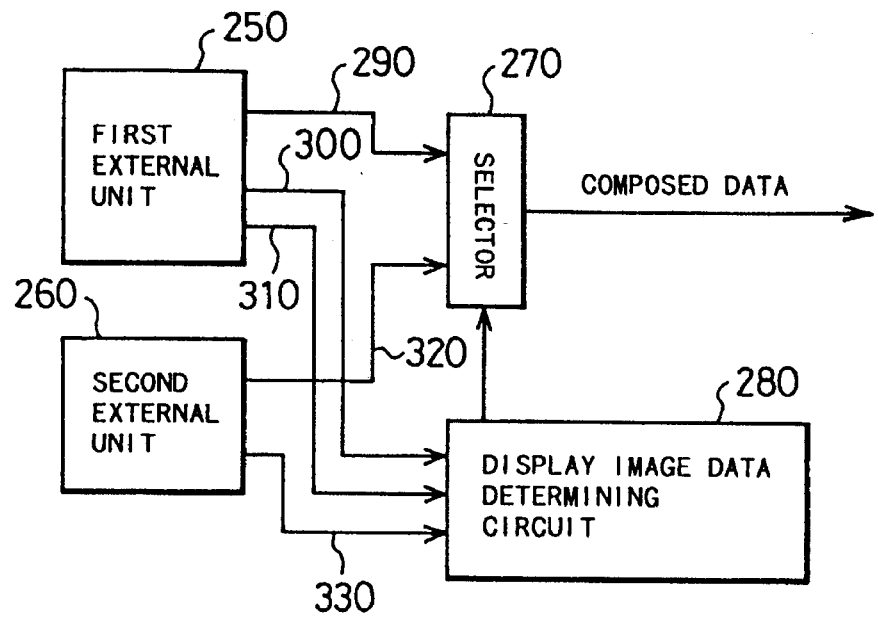
FIG. 11 is a block diagram showing structure of a conventional image processing apparatus.

The time-sharing data latch 74 latches output data from the third data selector 73 according to the system clock SCK. As shown in FIG. 9, a time period for one pixel is divided into four equal time segments, that is, first through fourth time segments, and the time-sharing data latch 74 latches an output from the third data selector 73 in every time segment. Output from the time-sharing data latch 74 is input into the pixel image data latch 76 as well as the specific image process computing element 75. The pixel image data latch 76 latches an output from the time-sharing data latch 74 according to the dot clock DCK. As shown in FIG. 9, the pixel image data latch 76 latches input data based on a pixel data latch signal output from the system control logic 90 after the time-sharing data latch 74 latches output data in the fourth time segment. Output of the pixel image data latch 76 is updated by every time period for one pixel.

The specific image process computing element 75 executes a hardware operation for composing an output from the data selector 65+72 and an output from the time-sharing data latch 74 according to a predetermined operator. The specific image process computing element 75 mixes 24-bit color digital video data according to a ratio or coefficients specified by the coefficient register 130. Basically, the specific image process computing element 75 multiplies two input data by respective coefficients specified by the coefficient register 130 and determines a sum of the products. An output from the specific image process computing element 75 is expressed as:

$$c = m \times a + n \times b \qquad (1)$$

where a denotes output data from the data selector 65+72, b shows latch data of the time-sharing data latch 74, and m and n respectively show coefficients specified by the coefficient register 130.

Since YUV data is processed in actual operation, the above equation (1) is rewritten for Y, U, and V data as:

$$Y_c = m_y \times Y_a + n \times Y_b \qquad (2)$$

$$U_c = m_u \times (U_a - 80h) + n_u \times (U_b - 80h) + 80h \qquad (3)$$

$$V_c = m_v \times (V_a - 80h) + n_v \times (V_b - 80h) + 80h \qquad (4)$$

where subscripts a, b, and c correspond to a, b, c in equation (1), and subscripts y, u, and v respectively show Y, U, and V data. Each coefficient my, mu, mv, ny, nu, or nv is determined by dividing a value (0 through 8) set in the value of the register number 1 through 3 of the effective coefficient register 130 by the value '8'. In the equations (3) and (4), 80h in binary coded decimal notation is subtracted from each U data and V data before multiplication by a corresponding coefficient, and 80h is added after the operation. This is because that U data and V data represent data each having a positive or negative sign, where 80h is equal to zero. Results of operation by the specific image process computing element 75 are latched by the time-sharing data latch 74 via the third data selector 73.

Operation of the video composing element 50b is described according to the block diagram of FIG. 8 and the timing chart of FIG. 9. At a first step, the MPU 40 sets a priority sequence for video data input from the units 45, 47, and 49 in the priority sequence chromakey control circuit 96 via the system control logic 90. For example, video data from the VDP unit 49, video data from the video data decompression unit 47, and video data from the video signal control unit 45 have higher priorities in this order. Video data having a highest priority is laid over the others while video data having a lowest priority is laid under the others. The priority sequence once set by the MPU 40 is maintained until a new priority sequence is determined.

The image processing apparatus of the embodiment divides a time period corresponding to one pixel into a plurality of phases (for example, phases 1 through 4) equal to or greater than a number of video data, and processes video data according to a time-sharing process described below. A cycle of the system clock SCK is determined by dividing a transfer rate of input digital video data or dot clock DCK by a value equal to or greater than a number of input video data. In the embodiment, the transfer rate of data is equal to 200 nS and the number of input video data is equal to four (two sets of video data are transferred from the VDP unit 49), the value 50 nS (=200 nS/4) is set as the cycle of the system clock SCK. The priority sequence chromakey control circuit 96 detects a timing of the phase 1 according to the dot clock DCK and the system clock SCK, and drives the data selector 65+72 to select video data having a lowest priority (in the embodiment, video data from the video signal control unit 45).

The video data selected by the data selector 65+72 is immediately input into the specific image process computing element 75. At a timing of the phase 1, the number 0 effective coefficient register 130 is selected, when the third data selector 73 selects an output from the data selector 65+72 instead of an output from the specific image process computing element 75 and the time-sharing data latch 74 latches the video data having the lowest priority without the operation described above. Although the third data selector 73 is switched according to output from the coefficient register 130 in the embodiment, the system control logic 90 may output an operation inhibit signal to prevent the specific image process computing element 75 from starting the above operation, so that an output signal from the data selector 65+72 is directly latched by the time-sharing data latch 74 via the specific image process computing element 75.

In any case, the time-sharing data latch 74 latches digital video data with the lowest priority in the phase 1. At a timing of the phase 2, the data selector 65+72 selects digital video data having a second lowest priority, which is then input into the specific image process computing element 75. The specific image process computing element 75 also receives an output from the time-sharing data latch 74, that is, digital video data with the lowest priority. The specific image process computing element 75 subsequently executes the operations expressed by the above equations (2) through (4).

Basically, after multiplying Y, U, and V data by respective coefficients (integers between 0 and 8), the computing element 75 adds two data to each other for every color and then divided by eight (shifted rightward by three bits).

As a result of the operation, two digital video data are overlapped with each other at a mixing rate of 0/8:1/8, 1/8:7/8, 2/8:6/8, ... 7/8:1/8, or 8/8:0.8. The MPU 40 gives an independent coefficient for every video data in the coefficient register 130. The priority sequence chromakey control circuit 96 outputs a selection signal representing selection of video data, and selects a coefficient corresponding to the selected video data to set the coefficient in the coefficient register 130 and output the coefficient to the specific image process computing element 75. The coefficient is an 8-bit value, the upper four bits representing a coefficient for digital video data a and the lower four bits representing the same for digital video data b. An integer selected out of the nine values 0 through 8 is respectively set in the upper four bits and the lower four bits.

Transparency processing is also executed during the above operation. The specific image process computing element 75 checks transparency information included in control data. When transparency information is set to one, the specific image process computing element 75 inputs digital video data previously output from the time-sharing data latch 74 again into the time-sharing data latch 74 via the third data selector 73 without any operation. At this moment, digital video data output from the data selector 65+72 does not affect output of the specific image process computing element 75 so as to keep the output data completely transparent. The transparency processing may also be realized by preventing latch pulses from being output to the time-sharing data latch 74. In this case, digital video data does not pass through the specific image process computing element 75 or the third data selector 73, thus simplifying operation and switching of the specific image process computing element 75.

An output of the specific image process computing element 75 is latched at a cycle of 50 nS corresponding to a rising edge of the system clock SCK by the time-sharing data latch 74. In the phase 3 or the phase 4, digital video data having corresponding priority are processed in the similar manner. At the end of the phase 4, the time-sharing data latch 74 latches final data, which is further latched at the end of a next phase 1 by the pixel image data latch 76. A latch pulse of the pixel image data latch 76 is generated by delaying the dot clock DCK by one cycle of the system clock SCK in a display circuit (not shown).

When a time period corresponding to one pixel is divided into a plurality of phases greater than the number of video data, an additional process may be executed; for example, a color stored in the fixed color register 140 may be superposed on a resultant image of the previous overlapping process. A certain color may be superposed upon video data having a lowest priority by setting the certain color specified by the fixed color register 140 in the time-sharing data latch 74 prior to selection of video data having the lowest priority.

Processing of digital video data of one dot is thus completed. After the mixing and transparency processing described above, digital video data is output from the pixel image data latch 76 for a subsequent process such as D/A conversion. The structure of the embodiment continuously and successively processes image data, thus realizing real-time processing of both still pictures and moving pictures.

Although 8-bit Y, U, and V digital video data are processed in the above embodiment, the same structure of the image processing apparatus may be applicable to digital video data of three primary colors such as RGB.

In the video game machine 20 of the embodiment, video data stored in the CD-ROM 21 or generated by the VDP unit 49 may freely be overlapped with one another or mixed with one another. A specific portion on a screen image may be displayed more brightly or darkly than the other portions to give specific spot-light or shading effects. This gives excellent three-dimensional effects on images in video games. Arbitrary determination of the coefficients allows smooth image switching by a well-known fade out and fade in technique, thus giving special effects on the turn of the scenes.

The image processing apparatus built in the video game machine 20 of the embodiment may execute multi-stage data mixing, for example, a multiple semi-transparent process where a mountain is seen through a train window which is shown through an aquarium. In the system of the embodiment, since the coefficients may be changed for each video data by the coefficient resister 130, degree of transparency may be set for each window according to the requirement.

Such an image superposing process is realized by repeated operation of one specific image process computing element 75. The fundamental design of the system including the specific image process computing element 75, the time-sharing data latch 74, and the pixel image data latch 76 is thereby applicable to processing a greater number of video data. Only one specific image process computing element 75 which executes operation several times for each dot makes the whole image processing apparatus compactly and efficiently designed.

The image processing apparatus of the embodiment is applicable to superposing video data of 16.77 million colors or 65,536 colors as well as pallet data of 256 colors, 16 colors, or 4 colors. Since pallet data are converted to 24-bit video data by referring to the color pallet 68 prior to operation of the specific image process computing element 75, the specific image process computing element 75 can process pallet data in the same manner as the other 24-bit video data.

Since there may be many modifications, changes, and alterations without departing from the scope or spirit of essential characteristics of the invention, it is clearly understood that the above embodiments are only illustrative and not restrictive in any sense. The spirit and scope of the present invention is only limited by the terms of the appended claims.

What is claimed is:

1. An image processing apparatus for receiving and processing a batch of pixels originating from a plurality of image data, said batch of pixels having image information intended to be superimposed in time and space to generate a single displayable pixel, said apparatus comprising:

input means for inputting said plurality of image data pixel by pixel from said batch of pixels;

image data selecting means for dividing an input time period for inputting one pixel into a plurality of divisions such that each of said divisions may be associated on a one to one basis with said plurality of image data thereby enabling each pixel of said batch of pixels to be input one at a time yet all within said input time period;

pixel processing means for executing a predetermined operation on a most recently input pixel in one division of said input time period thereby generating a specified image data;

divisional processed data storing means for latching said specific image data for use in a subsequent operation of said pixel processing means operating on a next input pixel, said next input pixel being a one of said batch of pixels which has not yet been processed by said pixel processing means; and output means for outputting contents of said divisional processed data storing means once each of said batch of pixels has been processed by said pixel processing means, said contents corresponding to said single displayable pixel.

2. An image processing apparatus in accordance with claim 1, wherein said image data selecting means alternatively selects image data input from a plurality of external units via said input means.

3. An image processing apparatus in accordance with claim 2, wherein said selection means selects image data at a cycle which is equal to or shorter than a time segment determined by dividing said input time period for inputting said pixel by a number of said plurality of external units.

4. An image processing apparatus in accordance with claim 1, wherein said pixel processing means further comprises means for overlapping said specific image data input from said input means with latched image data stored in said divisional processed data storing means.

5. An image processing apparatus in accordance with claim 4, said apparatus further comprising:

second parameter determination means for determining a parameter required for overlapping two or more images with one another;

wherein said pixel processing means further comprises means for determining a rate of mixing said specific image data input from said input means with said latched image data stored in said divisional processed data storing means according to said parameter.

6. An image processing apparatus in accordance with claim 5, wherein said second parameter determination means further comprises parameter setting means for setting said parameter by specifying color components constituting said pixel.

7. An image processing apparatus in accordance with claim 5, wherein said second parameter determination means further comprises divisional parameter setting means for setting said parameter in each division of said input time period.

8. An image processing apparatus in accordance with claim 5, said apparatus further comprising:

transparency parameter determination means for determining whether said parameter determined by said parameter determination means represent transparency; and transparency processing means for driving said divisional processed data storing means to output said contents stored therein when said transparency parameter determination means determines that said parameter represents transparency.

9. An image processing apparatus in accordance with claim 1, said apparatus further comprising:

first parameter determination means to determining a parameter required for image processing;

wherein said pixel processing means further comprises means for executing said predetermined operation according to said parameter.

10. An image processing apparatus in accordance with claim 9, wherein said first parameter determination means further comprises parameter setting means for setting said parameter by specifying a color component constituting said pixel.

11. An image processing apparatus in accordance with claim 9, wherein said first parameter determination means further comprises divisional parameter setting means for setting said parameter in each division of said input time period.

12. An image processing method for receiving and processing a plurality of image data, said method comprising the steps of:

(a) inputting said plurality of image data pixel by pixel;

(b1) dividing an input time period for inputting one pixel into a plurality of divisions;

(b2) selecting one of said plurality of image data according to a current division of said input time period:

(c) executing a predetermined operation with respect to a specific image data corresponding to a pixel input in said current division of said input time period;

(d) latching said specific image data processed in said step (c) for a subsequent execution of said predetermined process in a subsequent division of said input time period;

(e) repeatedly applying steps (b2)–(d) appropriately until single pixels from each of said plurality of image data has been processed and said input time period has completed; and (f) outputting said latched image data as processed image data at an end of said input time period.

13. An image processing apparatus for receiving a plurality of signals representing color images and executing a predetermined process with respect to said color images corresponding to said plurality of signals, said apparatus comprising:

signal input means for inputting said plurality of signals;

image identification signal output means for determining whether each of said input signals comprises a first image signal directly representing an image or a second image signal representing an image via a predetermined conversion, and outputting an identification signal based on said determination; and image signal adjusting means for executing said predetermined conversion for each of said input signals which is determined to be said second image signal by said image identification signal output means, so as to adjust said plurality of signals in a certain form allowing said predetermined process.

14. An image processing apparatus in accordance with claim 13, wherein said predetermined process comprises superposing a plurality of images.

15. An image processing apparatus in accordance with claim 13, wherein said predetermined conversion comprises a process of referring to a color pallet to output image data.

16. An image processing apparatus in accordance with claim 13, wherein said image identification signal output means comprises means for outputting a predetermined identification signal for each of said plurality of signals.

17. An image processing apparatus in accordance with claim 13, wherein said plurality of signals comprise an image signal corresponding to an image and an image-form signal representing a form of said image; and said image identification signal output means outputs said identification signal based on said image-form signal included in said plurality of signals.

18. An image processing apparatus for receiving a plurality of signals representing color images and executing a predetermined process with respect to said color images corresponding to said plurality of signals, said apparatus comprising:

signal input means for inputting said plurality of signals pixel by pixel;

image identification signal output means for determining whether each of said input signals comprises a first image signal directly representing an image or a second image signal representing an image via a predetermined conversion, and outputting a identification signal based on said determination;

image signal adjusting means for executing said predetermined conversion for each of said input signals which is determined to be said second image signal by said image identification signal output means, so as to adjust said plurality of signals in a certain form allowing said predetermined process;

image data selecting means for dividing an input time period for inputting one pixel into a plurality of divisions equivalent to the number of said image data and selecting one of said plurality of image data according to division of said input time period;

pixel processing means for executing a predetermined operation on said selected image data input in one division of said input time period;

divisional processed data storing means for latching said specific image data operated on by said pixel processing means for said predetermined operation in another division of said input time period; and output means for outputting contents of said divisional processed data storing means which are obtained as a result of repeating said selection by said image data selecting means, said predetermined operation by said pixel processing means, and said latching of said image data operated by divisional processed data storing means a number of times corresponding to the number of said divisions as processed image data corresponding to said pixel at an end of said input time period.

19. An image processing apparatus for receiving a plurality of signals representing color images and executing a predetermined process with respect to said color images corresponding to said plurality of signals, said apparatus comprising:

signal input means for inputting said plurality of signals;

image identification signal output means for determining whether each of said input signals comprises either a first image signal directly representing a color and a brightness of each pixel or a second image signal indirectly representing the color and the brightness of each pixel by referring to a look-up table with a previously specified range of colors and brightness, and outputting an identification signal based on said determination; and image signal adjusting means for referring to said look-up table for each of said input signals which is determined to be said second image signal by said image identification signal output means, so as to adjust said plurality of signals in a certain form enabling execution of said predetermined process.

* * * * *